(12) United States Patent
Ting (10) Patent No.: US 7,773,804 B2
(45) Date of Patent: Aug. 10, 2010

(54) APPARATUS FOR ADJUSTING SPECIFIC COLOR ATTRIBUTES AND METHOD THEREOF

(75) Inventor: Hou-Chun Ting, Changhua County (TW)

(73) Assignee: Novatek Microelectronics Corp., Hsinchu (TW)

( * ) Notice: Subject to any disclaimer, the term of this patent is extended or adjusted under 35 U.S.C. 154(b) by 1056 days.

(21) Appl. No.: 11/458,673

(22) Filed: Jul. 19, 2006

(65) Prior Publication Data

US 2007/0126933 A1    Jun. 7, 2007

Related U.S. Application Data

(60) Provisional application No. 60/742,129, filed on Dec. 1, 2005.

(30) Foreign Application Priority Data

Apr. 6, 2006   (TW) ............................... 95112093 A (51) Int. Cl.
*G06K 9/00* (2006.01)

(52) U.S. Cl. ................... 382/167; 345/600; 358/518; 358/519; 358/520; 358/521; 358/522; 358/523; 348/649

(58) Field of Classification Search ............. 382/167; 348/649; 345/600; 358/518–523
See application file for complete search history.

(56) References Cited

U.S. PATENT DOCUMENTS

| 6,272,239 | B1 * | 8/2001 | Colla et al. ............ 382/167 |
| 6,434,266 | B1 | 8/2002 | Kanno et al. |
| 6,476,877 | B2 | 11/2002 | Kihara et al. |
| 2005/0248581 | A1 * | 11/2005 | Choe et al. ............ 345/581 |

* cited by examiner

*Primary Examiner*—Vikkram Bali
*Assistant Examiner*—Eueng-Nan Yeh
(74) *Attorney, Agent, or Firm*—Jianq Chyun IP Office (57) ABSTRACT

An apparatus for adjusting specific color attributes is provided. Wherein, the color space transforming unit receives a color input signal with R, G and B color attributes, and transforms it into a color middle signal with separated luminance (Y) and chrominance color attributes (Cb and Cr). The color controlling unit computes the hue of the color input signal to generate a hue signal and generates a hue signal, a saturation signal and an intensity fine-tune signal according to the hue signal, and computes the color input signal to generate an adjustment parameter and generates an adjusted saturation signal and an adjusted intensity fine-tune signal from the saturation signal and the intensity fine-tune signal according to the adjustment parameter. The color adjusting unit adjusts the color middle signal to output a color output signal according to the hue signal, the adjusted saturation signal and the adjusted intensity fine-tune signal.

19 Claims, 6 Drawing Sheets

APPARATUS FOR ADJUSTING SPECIFIC COLOR ATTRIBUTES AND METHOD THEREOF

CROSS-REFERENCE TO RELATED APPLICATION

This application claims the priority benefit of U.S.A. provisional application Ser. No. 60/742,129, filed on Dec. 1, 2005, all disclosures are incorporated therewith. This application also claims the priority of Taiwan application serial no. 95112093, filed Apr. 6, 2006. All disclosure of the Taiwan application is incorporated herein by reference.

BACKGROUND OF THE INVENTION

1. Field of Invention

The present invention relates to a color adjustment, and more particularly, to an apparatus for adjusting specific color attributes in an image for different color regions in the color space and a method thereof.

2. Description of Related Art

In the past, many color spaces have been defined to describe various colors. For example, the RGB color space is a Cartesian coordinate system, and red (R), green (G) and blue (B) are respectively three bases of the coordinate system. That is, in the RGB color space, any color can be described with the combination of the three color attributes of red (R), green (G) and blue (B). Although the RGB color space is mostly used in the input and output of image devices like scanners, displays, etc., as there is high relevance between each color attribute of the RGB color space, it is not suitable for image processing such as color adjustment.

Figure 1:
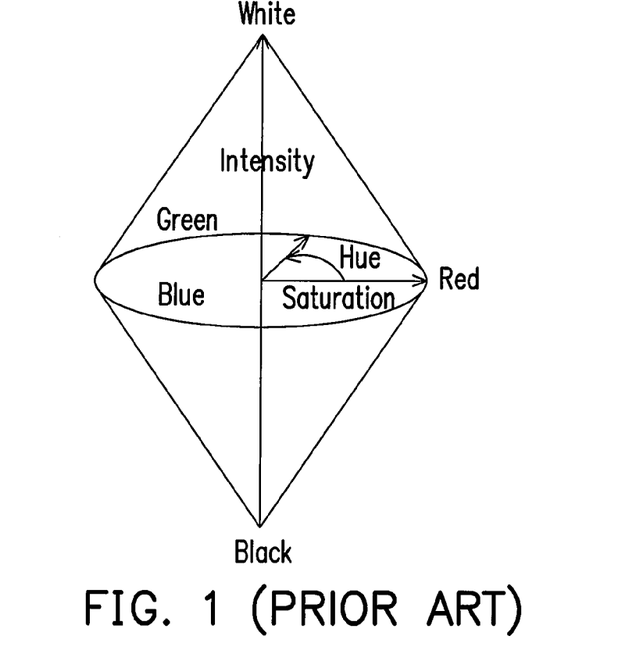
FIG. 1 is an HSI color space.

Comparatively, the HSI color space is more suitable for the image processing such as color adjustment. The HSI color space is closer to human vision sense and its color attributes have no relevance between each other. Referring to FIG. 1, the HSI color space is a coordinate system having three bases of hue (H), saturation (S) and intensity (I). Hue refers to the kind of color, that is, the color of light with different wavelength sensed by human eyes, such as red, orange, yellow, green and blue. Saturation refers to the purity of color, that is, the degree of white color infiltrating into the color. The higher saturation of color represents the less white infiltrating into the color. Intensity refers to the luminance of color, that is, the closer it is to white, the higher the intensity is, and the closer it is to black, the lower the intensity is. The value of hue is 0°~360°, and the values of saturation and intensity are 0~255 if they are represented by 8 bits.

Conventionally, the adjustment for the color of an image is achieved by transforming color attributes through a transformation matrix. However, the color adjusting method using the transformation matrix influences and adjusts each color region in the color space of image. That is to say, it is impossible to perform color adjustment for a certain color range only by rotating the color space through the transformation matrix. Also, although it is more suitable for adjusting color of image in the HSI color space, conventionally, the adjusting manner is not modified for different color regions of the HSI color space to avoid generating some problems when performing color adjustment at regions with acute change in hue. For example, fine-tuning performed near the center of the HSI color space leads to huge changes in saturation or intensity.

SUMMARY OF THE INVENTION

An objective of the present invention is to provide an apparatus for adjusting specific color attributes and a method thereof for modifying the color adjusting manner for different color regions in the color space, so as to accurately adjust colors.

Another objective of the present invention is to provide an apparatus for adjusting specific color attributes and a method thereof. The hue of a color input signal with luminance and chrominance not separated (which employs e.g. the RGB color space) is computed. A fine-tune signal is generated by using the hue with a mapping table to adjust color. Thus, colors can be adjusted flexibly and rapidly.

The present invention provides an apparatus for adjusting specific color attributes, which comprises a color space transforming unit, a color controlling unit and a color adjusting unit. The color space transforming unit is used to receive a color input signal with luminance and chrominance not separated, and transform it into a color middle signal with separated luminance and chrominance. The color controlling unit computes the hue of the color input signal to generate a hue signal, and computes the color input signal to generate an adjustment parameter. The color controlling unit generates a hue fine-tune signal, a saturation fine-tune signal and an intensity fine-tune signal according to the hue signal, and adjusts the saturation fine-tune signal and the intensity fine-tune signal according to the adjustment parameter to generate an adjusted saturation fine-tune signal and an adjusted intensity fine-tune signal. The color adjusting unit adjusts the color middle signal to output a color output signal according to the hue fine-tune signal, the adjusted saturation fine-tune signal and the adjusted intensity fine-tune signal.

In an embodiment, the above-mentioned color controlling unit comprises a hue computing unit, a fine-tune mapping table and a fine-tune signal adjusting unit. The hue computing unit computes the hue of the color input signal to generate a hue signal, and computes the color input signal to generate an adjustment parameter. The fine-tune mapping table generates a hue fine-tune signal, a saturation fine-tune signal and an intensity fine-tune signal according to the hue signal. The fine-tune signal adjusting unit generates a weight factor according to the adjustment parameter, and adjusts the saturation fine-tune signal and the intensity fine-tune signal with the weight factor to generate an adjusted saturation fine-tune signal and an adjusted intensity fine-tune signal.

The present invention provides a method for adjusting specific color attributes. First, a color input signal with luminance and chrominance not separated is received and transformed into a color middle signal with separated luminance and chrominance. The hue of the color input signal is computed to generate a hue signal, and a hue fine-tune signal, a saturation fine-tune signal and an intensity fine-tune signal are generated according to the hue signal. The color input signal is computed to generate an adjustment parameter, and the saturation fine-tune signal and the intensity fine-tune signal are adjusted according to the adjustment parameter to generate an adjusted saturation fine-tune signal and an adjusted intensity fine-tune signal. Finally, the color middle signal is adjusted according to the hue fine-tune signal, the adjusted saturation fine-tune signal and the adjusted intensity fine-tune signal to output a color output signal.

In the present invention, as the color controlling unit modifies the color adjusting manner for different color regions in the color space (that is, adjusting the saturation fine-tune signal and the intensity fine-tune signal to generate an adjusted saturation fine-tune signal and an adjusted intensity fine-tune signal), the problems occurred when performing color adjustment at regions with acute change in hue can be avoided.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

To facilitate illustration, hereinafter, the color input signal takes the RGB image signal (that is, an image signal represented by the RGB color space) as an example, and the color intermediate signal and the color output signal take the YCbCr image signal (that is, an image signal represented by the YCbCr color space) as examples. The YCbCr color space is a coordinate system having three bases of luminance (Y), blue chrominance (Cb) and red chrominance (Cr), wherein the blue chrominance (Cb) and the red chrominance (Cr) are generally called chrominance. Therefore, the RGB image signal is a signal with luminance and chrominance not separated, and the YCbCr image signal is a signal with separated luminance and chrominance.

Figure 2:
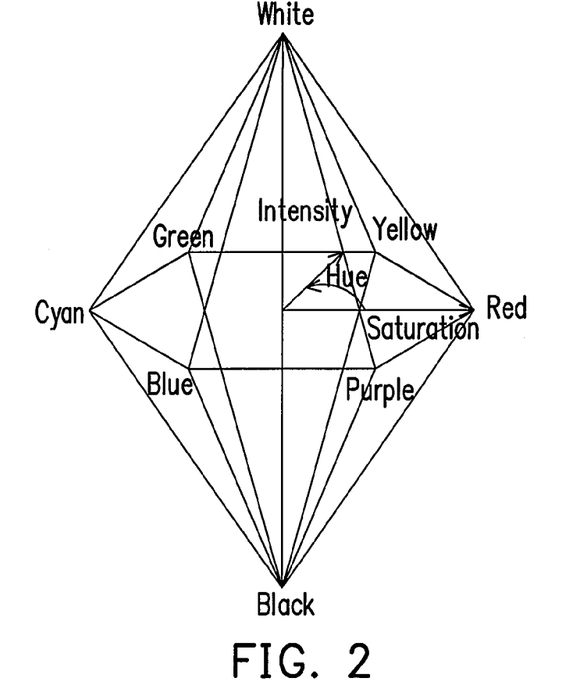
FIGS. 2 and 3 are a simplified HSI color space.

In consideration of reducing the cost of hardware realization, the color adjusting scheme of the present invention is implemented on a simplified HSI color space, as shown in FIG. 2. The formula for transforming the RGB to the simplified HSI color space is as follows:

$$LP = \max(R, G, B) \quad (1)$$

$$SP = \min(R, G, B) \quad (2)$$

$$r = (LP - R)/(LP - SP) \quad (3)$$

$$g = (LP - G)/(LP - SP) \quad (4)$$

$$b = (LP - B)/(LP - SP) \quad (5)$$

$$I = (LP + SP)/2 \quad (6)$$

$$\text{If } I \leq 0.5, \text{ then } S = (LP - SP)/(LP + SP) \quad (7)$$

$$\text{If } I > 0.5, \text{ then } S = (LP - SP)/(2 - LP - SP) \quad (8)$$

$$\text{If } R = LP, \text{ then } H = 60 \times (b - g) \quad (9)$$

$$\text{If } G = LP, \text{ then } H = 60 \times (2 + r - b) \quad (10)$$

$$\text{If } B = LP, \text{ then } H = 60 \times (4 + g - r) \quad (11)$$

$$\text{If } H \geq 360, \text{ then } H = H - 360 \quad (12)$$

$$\text{If } H < 0, \text{ then } H = H + 360 \quad (13)$$

wherein, $\max(\cdot)$ and $\min(\cdot)$ are respectively functions of taking a maximum value and a minimum value, thus LP and SP are respectively a maximum value signal and a minimum value signal. In addition, R, G and B are respectively the values of red, green and blue, and I, S and H are respectively the values of intensity, saturation and hue. As for formula (7) and formula (8), if LP=SP, then S=0. As for formula (12), H=H−360 refers that, when H≧360, the value of subtracting 360 from the H value is the actual H value. As for formula (13), H=H+360 refers that, when H<0, the value of adding 360 to the H value is the actual H value.

Figure 4:
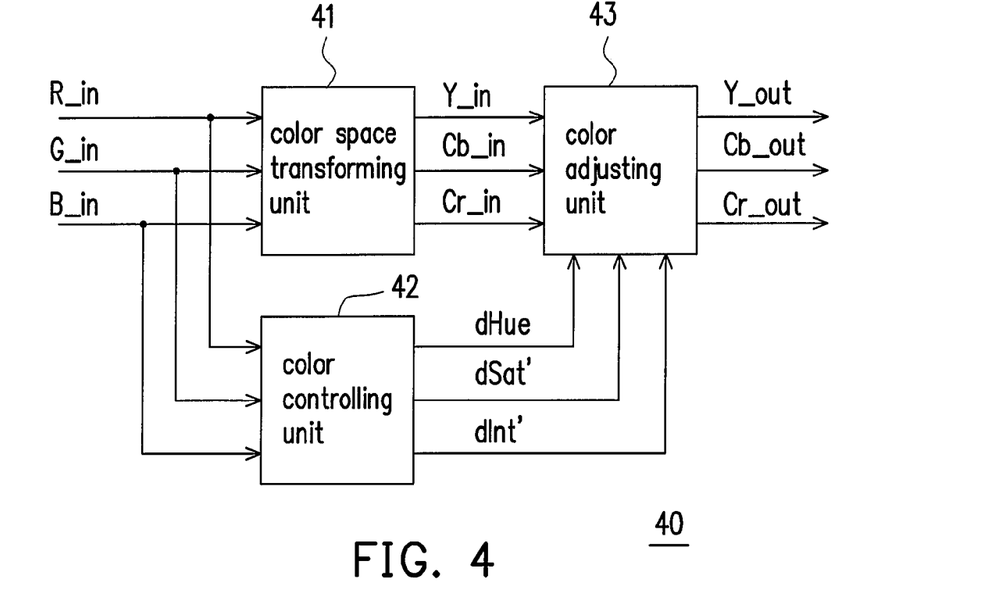
FIG. 4 is a block diagram of an apparatus for adjusting specific color attributes according to an embodiment of the present invention.

FIG. 4 is a block diagram of an apparatus for adjusting specific color attributes according to an embodiment of the present invention. Referring to FIG. 4, the apparatus for adjusting specific color attributes 40 comprises a color space transforming unit 41, a color controlling unit 42 and a color adjusting unit 43. Referring to FIG. 4, the color space transforming unit 41 receives a color input signal (its color attributes include R_in, G_in and B_in signals), and transforms the color input signal into a color intermediate signal (its color attributes include Y_in, Cb_in and Cr_in signals). According to a hue fine-tune signal dHue, an adjusted saturation fine-tune signal dSat' and an adjusted intensity fine-tune signal dInt', the color adjusting unit 43 adjusts the color intermediate signal to output a color output signal (its color attributes include Y_out, Cb_out and Cr_out signals).

Figure 5:
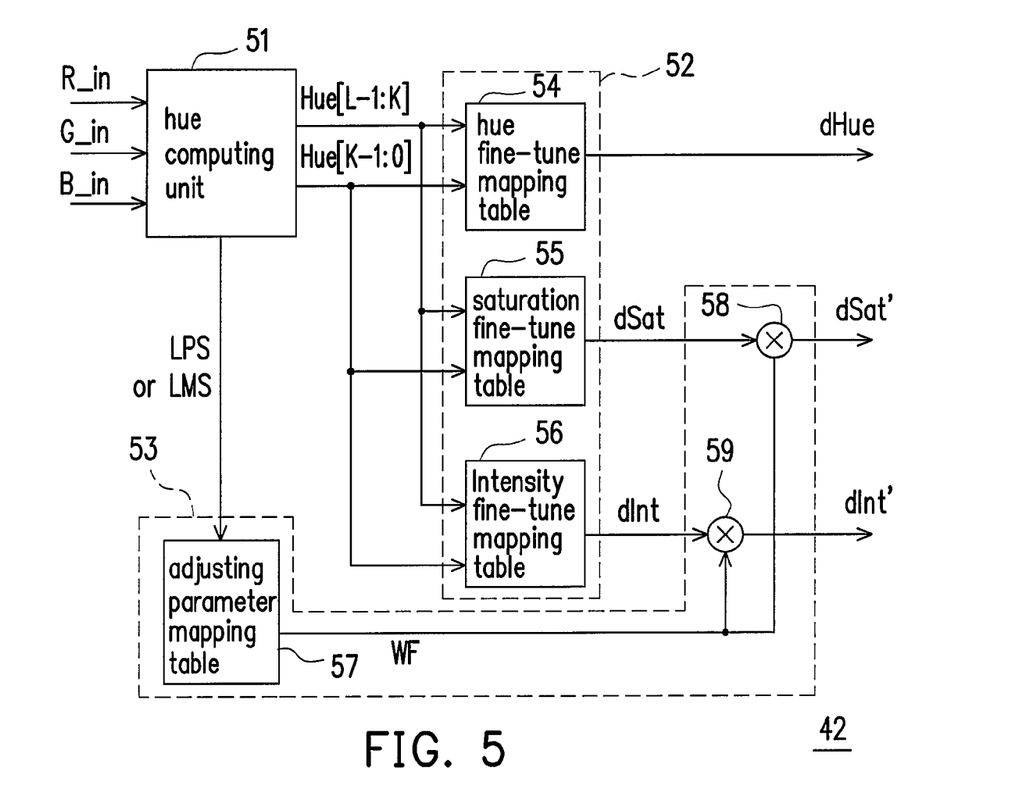
FIG. 5 is a block diagram of a color controlling unit in the apparatus shown in FIG. 4.

Next, the color controlling unit 42 generates the hue fine-tune signal dHue, the adjusted saturation fine-tune signal dSat' and the adjusted intensity fine-tune signal dInt' is illustrated. Referring to FIG. 5, it is a block diagram of the color controlling unit 42 in FIG. 4. The color controlling unit 42 includes a hue computing unit 51, a fine-tune mapping table 52 and a fine-tune signal adjusting unit 53. The fine-tune mapping table 52 further includes a hue fine-tune mapping table 54, a saturation fine-tune mapping table 55 and an intensity fine-tune mapping table 56. The fine-tune signal adjusting unit 53 further includes an adjustment parameter mapping table 57 and multipliers 58 and 59.

Figure 6:
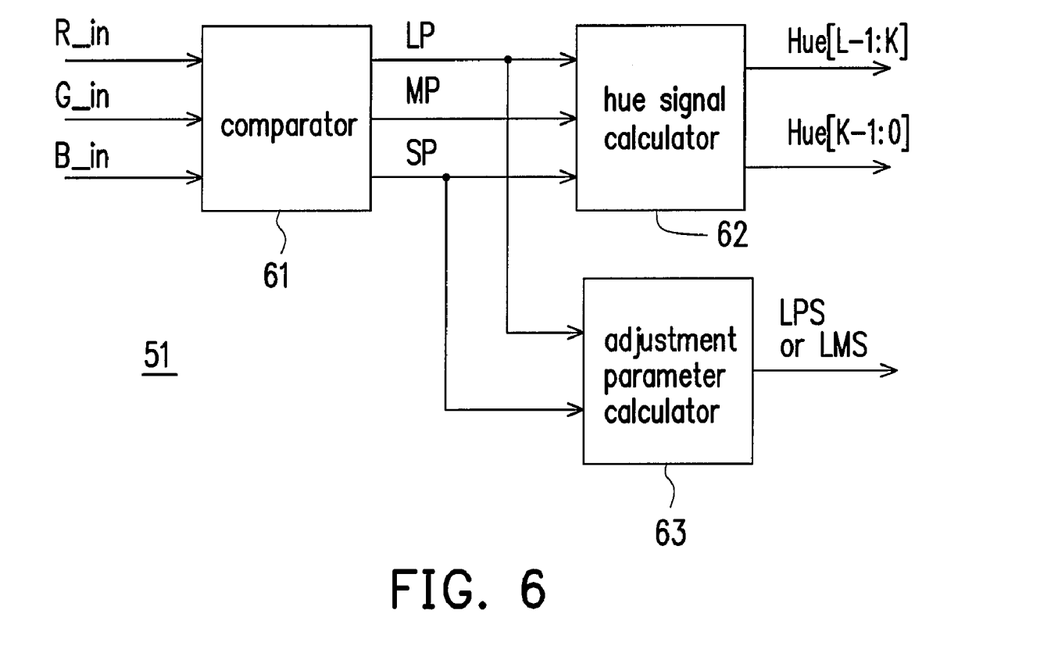
FIG. 6 is a block diagram of a hue computing unit in the apparatus shown in FIG. 5.

The detailed circuit block of the hue computing unit 51 is as shown in FIG. 6. Referring to FIG. 6, first a comparator 61 uses formula (1), formula (2) and the following formula $$MP = \text{med}(R, G, B) \quad (14)$$

to substitute the values of R_in, G_in and B_in signals respectively to R, G and B in the formula to generate a maximum value signal LP, a medium value signal MP and a minimum value signal SP, wherein $\text{med}(\cdot)$ is the function taking the medium value.

Following the eqs. (9)~(13), a hue signal calculator 62 uses the following formula $$\text{Hue} = \frac{H}{60} \times 2^{L-3} \quad (15)$$

to compute and obtain a hue signal Hue. In this embodiment, the L bit hue signal Hue is divided into Hue[L−1:K] containing L−K MSB bits and Hue[K−1:0] containing K LSB bits. The hue signal Hue[L−1:K] is used to refer two table entries adjacent to the value of the actual hue signal (e.g. red and yellow), and the hue signal Hue [K−1:0] is used to generate and the final mapping output by interpolating the adjacent two table entries. In addition, an adjustment parameter calculator 63 uses the following formula $$LPS=(LP+SP)/2 \quad (16)$$

$$LMS=LB-SP \quad (17)$$

to compute and obtain a first adjustment parameter LPS and/or a second adjustment parameter LMS. The functions of the adjustment parameter LPS and/or LMS will be illustrated in detail below.

Figure 7:
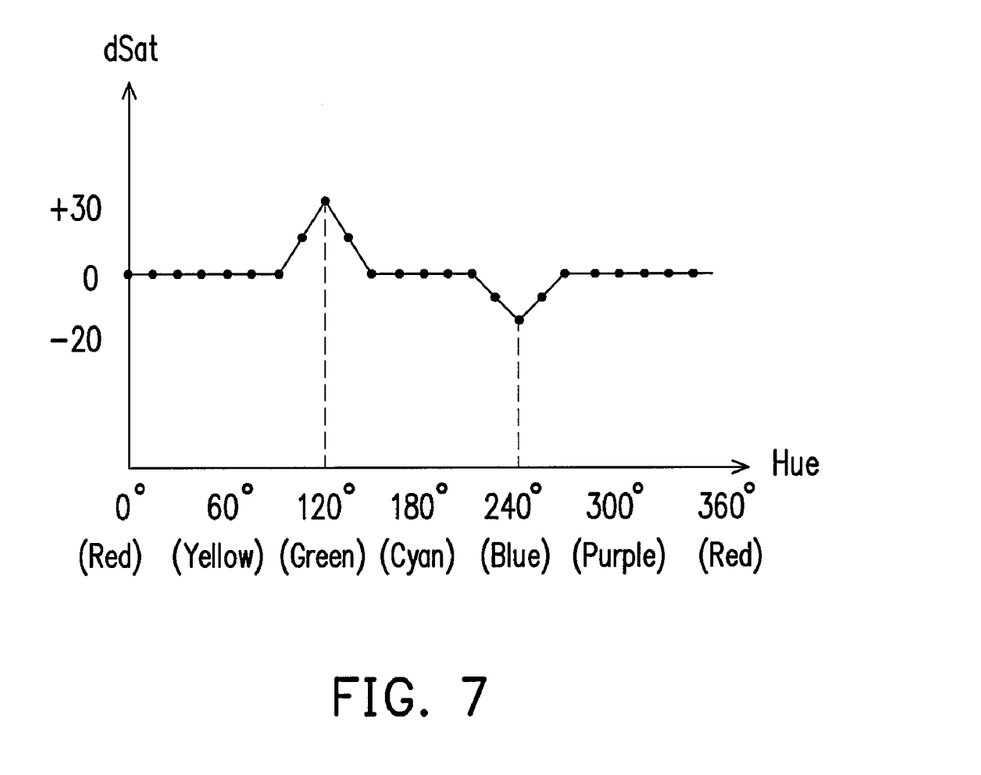
FIG. 7 is an embodiment of adjusting the saturation fine-tune signal according to a hue signal in the apparatus shown in FIG. 5.

Referring to FIG. 5, the fine-tune mapping table 52 receives the hue signal Hue recorded in Hue[L−1:K] and Hue[K−1:0], and respectively generates a hue fine-tune signal dHue, a saturation fine-tune signal dSat and an intensity fine-tune signal dInt with the hue fine-tune mapping table 54, the saturation fine-tune mapping table 55 and the intensity fine-tune mapping table 56. For example, FIG. 7 is the mapping relationship between the hue signal Hue and the fine-tune signal dSat. In this embodiment, saturation is increased for green, and is reduced for blue. Certainly, data in the fine-tune mapping table 52 can be altered according to requirements to adjust the mapping relationship between the hue signal Hue and the fine-tune signals dHue, dSat, dint, so as to adjust it to a certain color for the user preferences in different countries.

However, at the regions in the HSI color space with acute change in hue, some problems will occur in such a color attributes adjusting method. In order to illustrate the causes to those problems, please refer to the simplified HSI color space shown in FIG. 3, wherein regions 31~34 are all respectively a plane of the simplified HSI color space. When the hue signal Hue is used to fine-tune a certain color region at high intensity (such as region 32), low intensity (such as region 33) or low saturation (such as region 34), even a little adjustment may lead to the acute changes in saturation or intensity of the pixel.

Therefore, the present invention modifies color adjustment according to different color regions of the simplified HSI color space to avoid the problems that may occur at the regions with acute change in hue. Referring to FIG. 5 again, the present invention uses the hue computing unit 51 to provide an adjustment parameter LPS and/or LMS to the fine-tune signal adjusting unit 53, and uses the adjustment parameter mapping table 57 to generate a weight factor WF according to the adjustment parameter LPS and/or LMS, so as to adjust the fine-tune signals dSat and dInt for different color regions of the color space. In this embodiment, the multiplier 58 multiplies the saturation fine-tune signal dSat by the weight factor WF to generate an adjusted saturation fine-tune signal dSat', and the multiplier 59 multiplies the intensity fine-tune signal dInt by the weight factor WF to generate an adjusted intensity fine-tune signal dInt'. Certainly, the multipliers 58 and 59 may also use the mapping table to achieve the function of multiplication.

Figure 3:
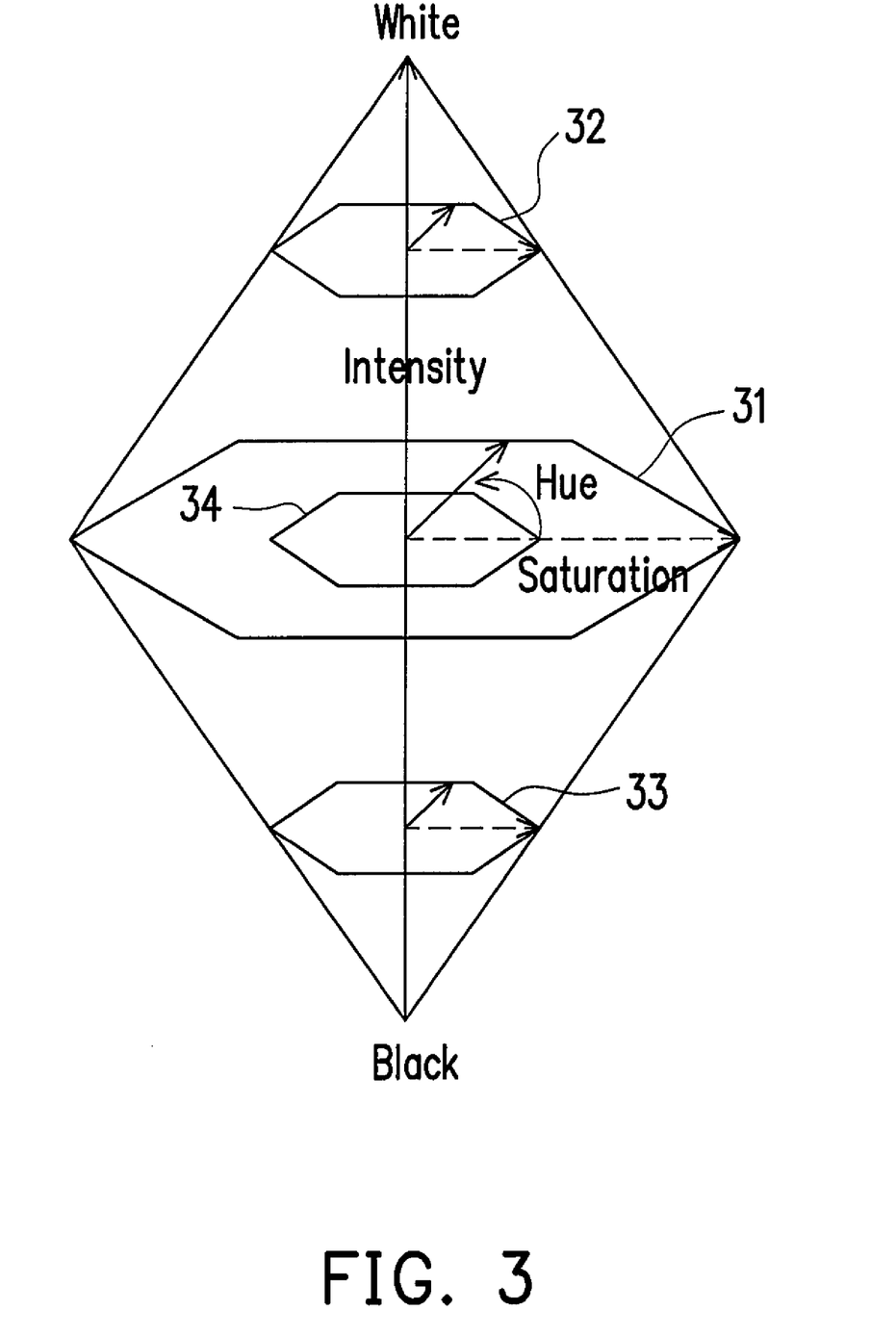
Figure 8A:
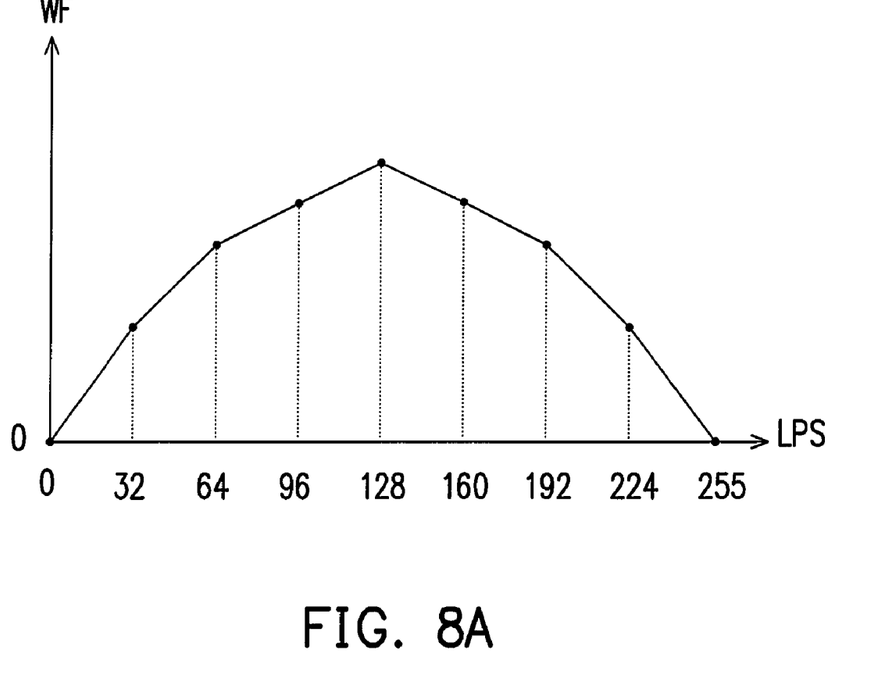
FIG. 8A is an embodiment of adjusting the weight factor according to an adjustment parameter LPS in the apparatus shown in FIG. 5.

Referring to FIG. 8A, it is an embodiment of the mapping relationship between the adjustment parameter LPS and the weight factor WF. In FIG. 3, it is clear that intensity is an important factor leading to changes in saturation or intensity in the fine-tune process. For example, the higher the intensity is (the extreme situation is a plane very close to white) or the lower the intensity is (the extreme situation is a plane very close to black), the greater the changes in saturation or intensity caused by fine-tune is. As intensity I=(LP+SP)/2 and adjustment parameter LPS (LP+SP)/2, the lower or higher the intensity I is designed (that is, the lower or higher the adjustment parameter LPS is), the lower the weight factor WF is, thus the mapping relationship between the adjustment parameter LPS and the weight factor WF is preferably a bell-shaped curve.

Figure 8B:
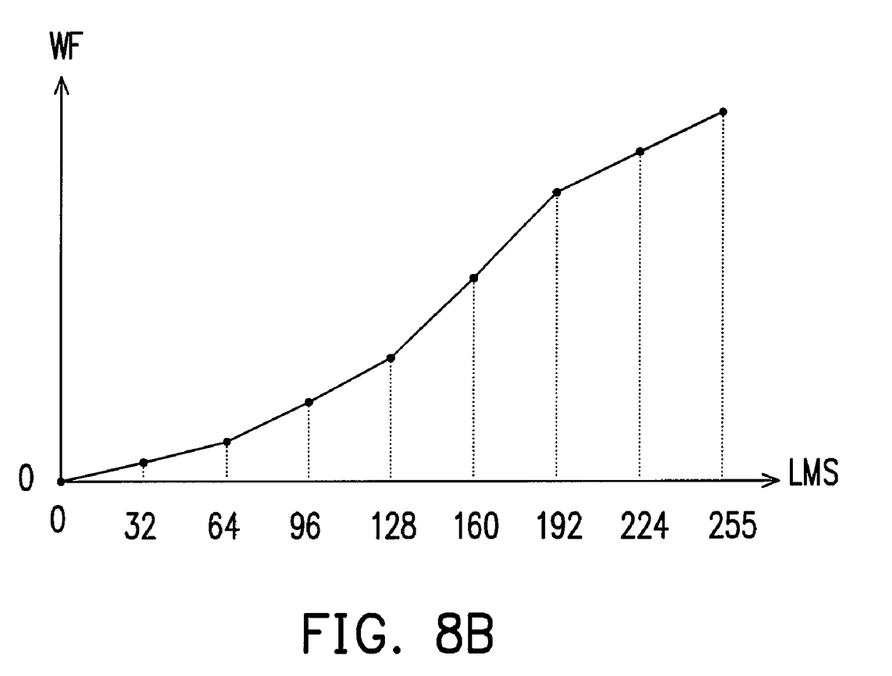
FIG. 8B is an embodiment of adjusting the weight factor according to an adjustment parameter LMS in the apparatus shown in FIG. 5.

Referring to FIG. 8B, it is an embodiment of the mapping relationship between the adjustment parameter LMS and the weight factor WF. Although intensity is an important factor leading to changes in saturation or intensity in the fine-tune process, saturation is also a factor thereof. Considering the changes in saturation or intensity in the fine-tune process, the product of the two D=2×I×S is used to estimate the influence degree of the two. Substituting formulae (6)~(8) into D=2×I×S to obtain the following formula:

$$\text{If } I \leq 0.5, \text{ then } D=LP-SP \quad (18)$$

$$\text{If } I>0.5, \text{ then } D=(LP+SP)\times(LP-SP)/(2-LP-SP) \quad (19)$$

Also, as fine-tuning at low intensity does not lead to acute changes in saturation or intensity, formula (19) can be simplified into D=LP−SP by multiplying (2−LP−SP)/(LP+SP), thus formulae (18) and (19) can be combined into D=LP−SP at low intensity. Therefore, the mapping relationship between the adjustment parameter LMS and the weight factor WF is preferably an incremental curve.

Figure 9:
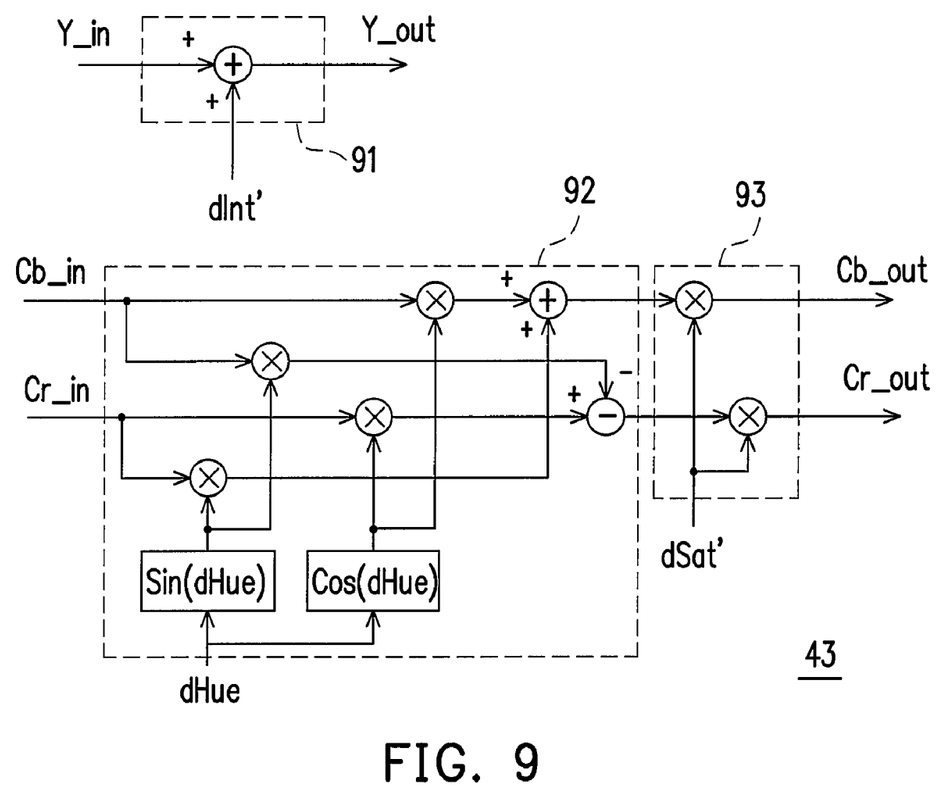
FIG. 9 is a block diagram of a color adjusting unit in the apparatus shown in FIG. 4.

FIG. 9 is a block diagram of the color adjusting unit 43 in FIG. 4. Referring to FIG. 9, in the color adjusting unit 43, the Y_out signal is generated by an intensity adjusting unit 91 adjusting the Y_in signal according to the adjusted fine-tune signal dInt'. In addition, the Cb_out and the Cr_out signals are generated first by a hue adjusting unit 92 adjusting the Cb_in and Cr_in signals respectively according to the fine-tune signal dHue and then by a saturation adjusting unit 93 adjusting them respectively according to the adjusted fine-tune signal dSat'. Therefore, the relationship between the color output signal and the color middle signal is as follows:

$$Y\_out=Y\_in+dInt' \quad (20)$$

$$Cb\_out=[Cb\_in\times\cos(dHue)+Cr\_in\times\sin(dHue)]\times dSat' \quad (21)$$

$$Cr\_out=[Cr\_in\times\cos(dHue)-Cb\_in\times\sin(dHue)]\times dSat' \quad (22)$$

wherein, the first factor cos(dHue) is the cosine value of the hue fine-tune signal dHue, and the second factor sin(dHue) is the sine value of the hue fine-tune signal dHue.

In summary, in the present invention, as the color controlling unit modifies the color adjusting manner for different color regions in the color space (that is, adjusting the saturation fine-tune signal and the intensity fine-tune signal to generate an adjusted saturation fine-tune signal and an adjusted intensity fine-tune signal), the problems occurred when performing color adjustment at regions with the acute change in hue can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for adjusting specific color attributes, comprising:

a processor comprising a color space transforming unit, for receiving a color input signal with luminance and chrominance not separated, and transforming it into a color intermediate signal with separated luminance and chrominance;

a color controlling unit, for computing the hue of the color input signal to generate a hue signal, computing the color input signal to generate an adjustment parameter, generating a hue fine-tune signal, a saturation fine-tune signal and an intensity fine-tune signal according to the hue signal, and adjusting the saturation fine-tune signal according to the adjustment parameter to generate an adjusted saturation fine-tune signal or adjusting the intensity fine-tune signal according to the adjustment parameter to generate an adjusted intensity fine-tune signal, wherein the color controlling unit comprises a hue computing unit, for computing the hue of the color input signal to generate the hue signal, and computing the color input signal to generate the adjustment parameter;

a fine-tune mapping table, for generating the hue fine-tune signal, the saturation fine-tune signal and the intensity fine-tune signal according to the hue signal;

and a fine-tune signal adjusting unit, for generating a weight factor according to the adjustment parameter, and adjusting the saturation fine-tune signal and the intensity fine-tune signal by using the weight factor to generate the adjusted saturation fine-tune signal and the adjusted intensity fine-tune signal; and a color adjusting unit, for adjusting the color intermediate signal according to the hue fine-tune signal, the adjusted saturation fine-tune signal or the adjusted intensity fine-tune signal to output a color output signal.

2. The apparatus for adjusting specific color attributes as claimed in claim 1, wherein the color attributes of the color input signal comprise red (R), green (G) and blue (B).

3. The apparatus for adjusting specific color attributes as claimed in claim 1, wherein the color attributes of the color intermediate signal and the color output signal comprise luminance (Y), blue chrominance (Cb) and red chrominance (Cr).

4. The apparatus for adjusting specific color attributes as claimed in claim 1, wherein the color attributes of the color controlling unit signal comprise a hue signal (H), a saturation signal (S) and an intensity signal (I).

5. The apparatus for adjusting specific color attributes as claimed in claim 1, wherein the hue computing unit comprises:

a comparator, for selecting the one with the maximum value, the one with the medium value and the one with the minimum value from the color attributes of the color input signal, so as to output them respectively as a maximum value signal, a medium value signal and a minimum value signal;

a hue signal calculator, for computing the hue signal according to the maximum value signal, the medium value signal and the minimum value signal; and an adjustment parameter calculator, for computing the adjustment parameter according to the maximum value signal and the minimum value signal.

6. The apparatus for adjusting specific color attributes as claimed in claim 5, wherein the hue signal is obtained by calculating the following formula, $Hue=H/60\times 2^{L-3}$, wherein Hue represents the hue signal, H represents a value of the hue, and L represents a number of bits of the hue signal Hue.

7. The apparatus for adjusting specific color attributes as claimed in claim 5, wherein the adjustment parameter comprises a first adjustment parameter, and its value is obtained by dividing the value of adding the maximum value signal and the minimum value signal by 2.

8. The apparatus for adjusting specific color attributes as claimed in claim 5, wherein the adjustment parameter comprises a second adjustment parameter, and its value is the value of subtracting the minimum value signal from the maximum value signal.

9. The apparatus for adjusting specific color attributes as claimed in claim 1, wherein the fine-tune mapping table comprises:

a hue fine-tune mapping table, for generating the hue fine-tune signal according to the hue signal;

a saturation fine-tune mapping table, for generating the saturation fine-tune signal according to the hue signal; and an intensity fine-tune mapping table, for generating the intensity fine-tune signal according to the hue signal.

10. The apparatus for adjusting specific color attributes as claimed in claim 1, wherein the fine-tune signal adjusting unit comprises:

an adjustment parameter mapping table, for generating the weight factor according to the adjustment parameter;

a first multiplier, for receiving the saturation fine-tune signal and the weight factor, and multiplying them to output the adjusted saturation fine-tune signal; and a second multiplier, for receiving the intensity fine-tune signal and the weight factor, and multiplying them to output the adjusted intensity fine-tune signal.

11. An apparatus for adjusting specific color attributes, comprising:

a processor comprising a color space transforming unit, for receiving a color input signal with luminance and chrominance not separated, and transforming it into a color intermediate signal with separated luminance and chrominance;

a color controlling unit, for computing the hue of the color input signal to generate a hue signal, computing the color input signal to generate an adjustment parameter, generating a hue fine-tune signal, a saturation fine-tune signal and an intensity fine-tune signal according to the hue signal, and adjusting the saturation fine-tune signal according to the adjustment parameter to generate an adjusted saturation fine-tune signal or adjusting the intensity fine-tune signal according to the adjustment parameter to generate an adjusted intensity fine-tune signal, wherein the color controlling unit comprises a hue computing unit, for computing the hue of the color input signal to generate the hue signal, and computing the color input signal to generate the adjustment parameter; and a color adjusting unit, for adjusting the color intermediate signal according to the hue fine-tune signal, the adjusted saturation fine-tune signal or the adjusted intensity fine-tune signal to output a color output signal, wherein the color attributes of the color intermediate signal and the color output signal comprise luminance (Y), blue chrominance (Cb) and red chrominance (Cr), wherein the luminance of the color output signal is obtained by adding the luminance of the color intermediate signal and the adjusted intensity fine-tune signal;

the blue chrominance of the color output signal is obtained by adding the blue chrominance of the color intermediate signal multiplying a first factor and the red chrominance of the color intermediate signal multiplying a second factor, and then multiplying the adjusted saturation fine-tune signal; and the red chrominance of the color output signal is obtained by subtracting the blue chrominance of the color intermediate signal multiplying the second factor from the red chrominance of the color intermediate signal multiplying the first factor, and then multiplying the adjusted saturation fine-tune signal, wherein, the first factor is the cosine value of the hue fine-tune signal, and the second factor is the sine value of the hue fine-tune signal.

12. A method for adjusting specific color attributes, comprising:

receiving a color input signal with luminance and chrominance not separated, and transforming it into a color intermediate signal with separated luminance and chrominance;

computing the hue of the color input signal to generate a hue signal, and generating a hue fine-tune signal, a saturation fine-tune signal and an intensity fine-tune signal according to the hue signal;

computing the color input signal to generate an adjustment parameter, and adjusting the saturation fine-tune signal according to the adjustment parameter to generate an adjusted saturation fine-tune signal or adjusting the intensity fine-tune signal according to the adjustment parameter to generate an adjusted intensity fine-tune signal;

adjusting the color intermediate signal according to the hue fine-tune signal, the adjusted saturation fine-tune signal or the adjusted intensity fine-tune signal to output a color output signal; and selecting the one with the maximum value, the one with the medium value and the one with the minimum value from the color attributes of the color input signal, so as to output them respectively as a maximum value signal, a medium value signal and a minimum value signal.

13. The method for adjusting color attributes as claimed in claim 12, wherein the color attributes of the color input signal comprise red (R), green (G) and blue (B).

14. The method for adjusting color attributes as claimed in claim 12, wherein the color attributes of the color intermediate signal and the color output signal comprise luminance (Y), blue chrominance (Cb) and red chrominance (Cr).

15. The method for adjusting color attributes as claimed in claim 14, wherein adjusting the color intermediate signal to output the color output signal comprises:

adding the luminance of the color intermediate signal and the adjusted intensity fine-tune signal to output the luminance of the color output signal;

adding the blue chrominance of the color intermediate signal multiplying a first factor and the red chrominance of the color intermediate signal multiplying a second factor, and multiplying the sum of the two with the adjusted saturation fine-tune signal to output the blue chrominance of the color output signal; and subtracting the blue chrominance of the color intermediate signal multiplying the second factor from the red chrominance of the color intermediate signal multiplying the first factor, and multiplying the difference of the two with the adjusted saturation fine-tune signal to output the red chrominance of the color output signal, wherein, the first factor is the cosine value of the hue fine-tune signal, and the second factor is the sine value of the hue fine-tune signal.

16. The method for adjusting color attributes as claimed in claim 12, wherein the hue signal is obtained by calculating the following formula, Hue=$H/60 \times 2^{L-3}$, wherein Hue represents the hue signal, H represents a value of the hue, and L represents a number of bits of the hue signal Hue.

17. The method for adjusting color attributes as claimed in claim 12, wherein the adjustment parameter comprises a first adjustment parameter, and its value is obtained by dividing the value of adding the maximum value signal and the minimum value signal by 2.

18. The method for adjusting color attributes as claimed in claim 12, wherein the adjustment parameter comprises a second adjustment parameter, and its value is the value of subtracting the minimum value signal from the maximum value signal.

19. The method for adjusting color attributes as claimed in claim 12, wherein generating the adjusted saturation fine-tune signal and the adjusted intensity fine-tune signal comprises:

generating a weight factor according to the adjustment parameter;

multiplying the saturation fine-tune signal by the weight factor to output the adjusted saturation fine-tune signal; and multiplying the intensity fine-tune signal by the weight factor to output the adjusted intensity fine-tune signal.

* * * * *